United States Patent
Zacharias et al.

(10) Patent No.: US 11,611,900 B2
(45) Date of Patent: Mar. 21, 2023

(54) LONG BUFFER STATUS REPORT USAGE TO INCREASE THROUGHPUT

(71) Applicant: QUALCOMM Incorporated, San Diego, CA (US)

(72) Inventors: Leena Zacharias, San Jose, CA (US); Arnaud Meylan, San Diego, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 17/175,470

(22) Filed: Feb. 12, 2021

(65) Prior Publication Data
US 2022/0264361 A1    Aug. 18, 2022

(51) Int. Cl.
*H04W 28/02* (2009.01)
*H04W 24/08* (2009.01)

(52) U.S. Cl.
CPC ....... *H04W 28/0278* (2013.01); *H04W 24/08* (2013.01); *H04W 28/0252* (2013.01)

(58) Field of Classification Search
None
See application file for complete search history.

(56) References Cited

U.S. PATENT DOCUMENTS

2020/0236580 A1\* 7/2020 Kim ................. H04W 72/1284

OTHER PUBLICATIONS

International Search Report and Written Opinion—PCT/US2022/070478—ISA/EPO—dated May 6, 2022.

\* cited by examiner

*Primary Examiner* — Saad Khawar
(74) *Attorney, Agent, or Firm* — Qualcomm Incorporated

(57) ABSTRACT

Various aspects of the present disclosure generally relate to wireless communication. In some aspects, a user equipment (UE) may detect a trigger for transmitting a buffer status report (BSR). The UE may transmit, to a base station, a long BSR for a single logical channel group (LCG) with data to be transmitted based at least in part on at least one of a determination that a current buffer size for the single LCG is greater than a maximum buffer size indication in a short BSR or a determination that a current achievable uplink throughput using the short BSR is less than a configured uplink throughput. Numerous other aspects are described.

30 Claims, 8 Drawing Sheets

| Network delay (ms) | Configured throughput (Mbps) | Current achievable throughput (Mbps) | Throughput gain with long BSR (Mbps) |
|---|---|---|---|
| 12 | 150 | 100 | 20 |
| 12 | 500 | 100 | 400 |
| 12 | 1000 | 100 | 900 |
| 2 | 150 | 600 | 0 |
| 2 | 500 | 600 | 0 |
| 2 | 1000 | 600 | 400 |

FIG. 4

LONG BUFFER STATUS REPORT USAGE TO INCREASE THROUGHPUT

FIELD OF THE DISCLOSURE

Aspects of the present disclosure generally relate to wireless communication and to techniques and apparatuses for long buffer status report (BSR) usage to increase throughput.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes detecting a trigger for transmitting a buffer status report (BSR); and transmitting, to a base station, a long BSR for a single logical channel group (LCG) with data to be transmitted based at least in part on at least one of a determination that a current buffer size for the single LCG is greater than a maximum buffer size indication in a short BSR.

In some aspects, a method of wireless communication performed by a base station includes receiving, from a UE with a single LCG that has uplink data to be transmitted, a long BSR that indicates a current buffer size of the single LCG; and selectively activating an uplink option for the UE based at least in part on the current buffer size indicated in the long BSR.

In some aspects, a UE for wireless communication includes a memory; and one or more processors operatively coupled to the memory, the memory and the one or more processors configured to: detect a trigger for transmitting a BSR; and transmit, to a base station, a long BSR for a single LCG with data to be transmitted based at least in part on at least one of a determination that a current buffer size for the single LCG is greater than a maximum buffer size indication in a short BSR.

In some aspects, a base station for wireless communication includes a memory; and one or more processors operatively coupled to the memory, the memory and the one or more processors configured to: receive, from a UE with a single LCG that has uplink data to be transmitted, a long BSR that indicates a current buffer size of the single LCG; and selectively activate an uplink option for the UE based at least in part on the current buffer size indicated in the long BSR.

In some aspects, a non-transitory computer-readable medium storing a set of instructions for wireless communication includes one or more instructions that, when executed by one or more processors of a UE, cause the UE to: detect a trigger for transmitting a BSR; and transmit, to a base station, a long BSR for a single LCG with data to be transmitted based at least in part on at least one of a determination that a current buffer size for the single LCG is greater than a maximum buffer size indication in a short BSR.

In some aspects, a non-transitory computer-readable medium storing a set of instructions for wireless communication includes one or more instructions that, when executed by one or more processors of a base station, cause the base station to: receive, from a UE with a single LCG that has uplink data to be transmitted, a long BSR that indicates a current buffer size of the single LCG; and selectively activate an uplink option for the UE based at least in part on the current buffer size indicated in the long BSR.

In some aspects, an apparatus for wireless communication includes means for detecting a trigger for transmitting a BSR; and means for transmitting, to a base station, a long BSR for a single LCG with data to be transmitted based at least in part on at least one of a determination that a current buffer size for the single LCG is greater than a maximum buffer size indication in a short BSR.

In some aspects, an apparatus for wireless communication includes means for receiving, from a UE with a single LCG that has uplink data to be transmitted, a long BSR that indicates a current buffer size of the single LCG; and means for selectively activating an uplink option for the UE based at least in part on the current buffer size indicated in the long BSR.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3-4 are diagrams illustrating examples associated with long buffer status report (BSR) usage to increase throughput, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
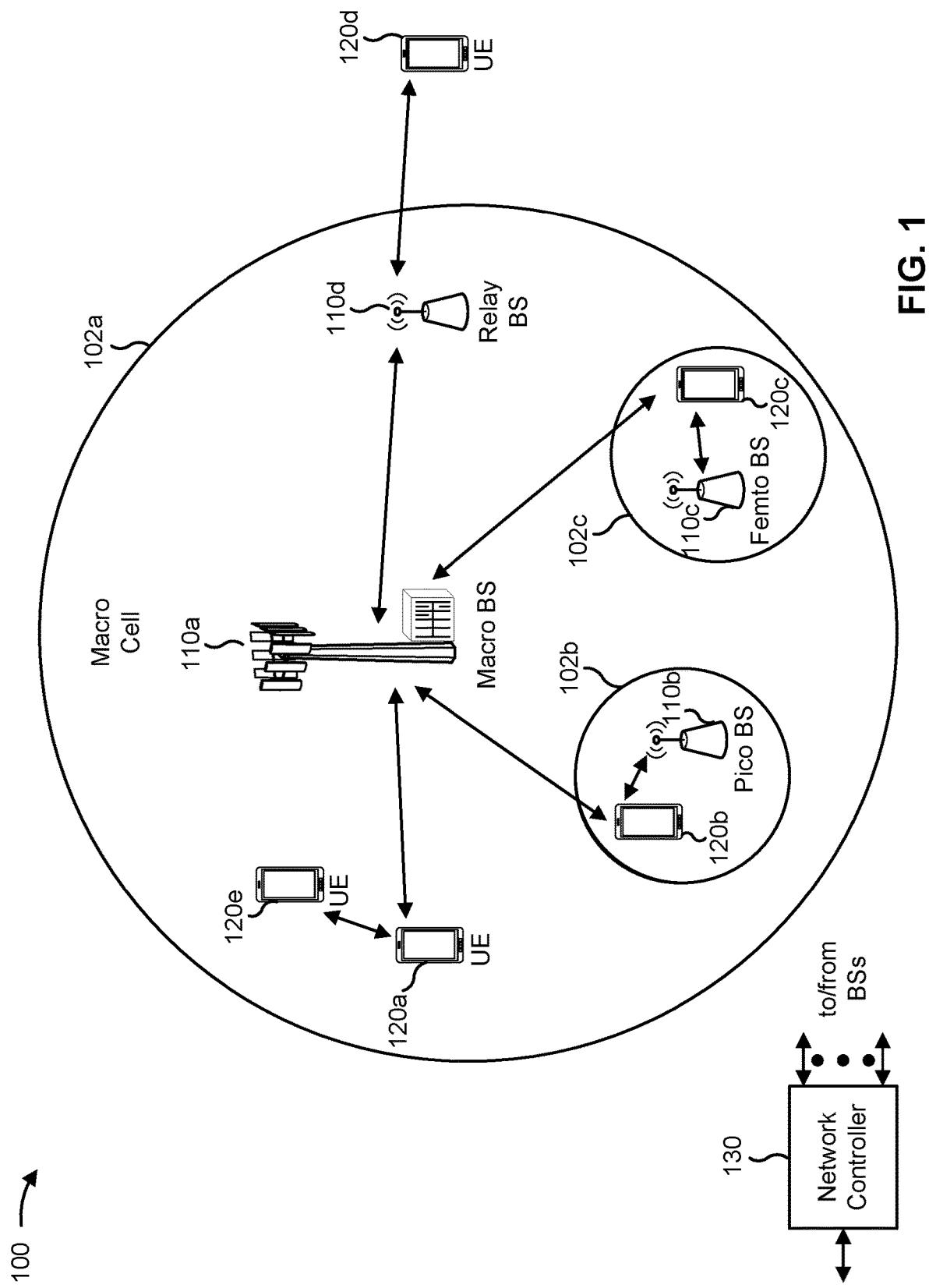
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
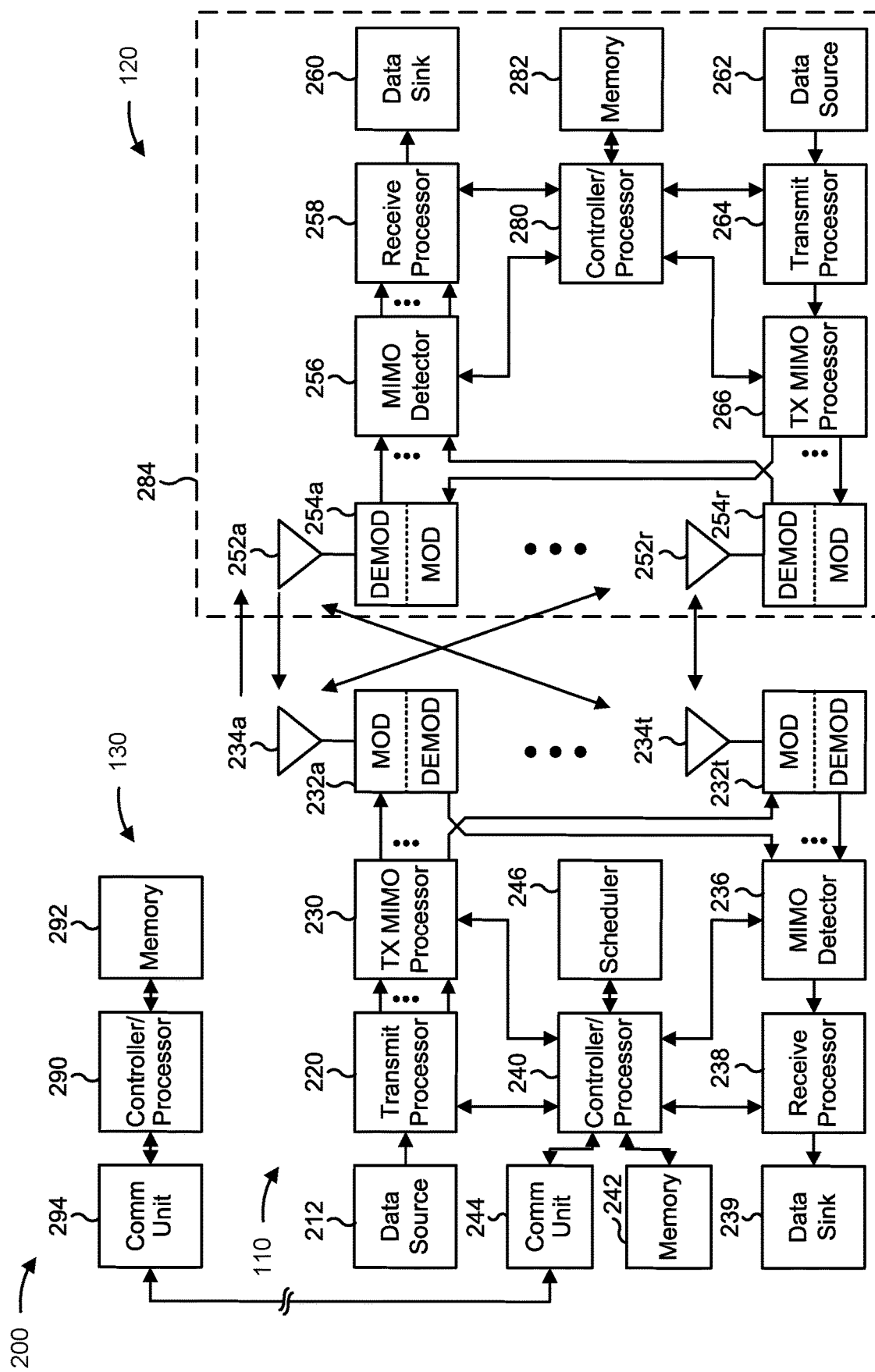
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-6.

Controller/processor 240 of base station 110, controller/processor 280 of UE 120, and/or any other component(s) of FIG. 2 may perform one or more techniques associated with long buffer status report (BSR) usage to increase throughput, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE 120 includes means for detecting a trigger for transmitting a BSR; and/or means for transmitting, to a base station, a long BSR for a single logical channel group (LCG) with data to be transmitted based at least in part on at least one of a determination that a current buffer size for the single LCG is greater than a maximum buffer size indication in a short BSR. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for transmitting the long BSR for the single LCG based at least in part the determination that the current buffer size for the single LCG is greater than the maximum buffer size indication in the short BSR and based at least in part on a determination that a current achievable uplink throughput using the short BSR is less than a configured uplink throughput.

In some aspects, the UE 120 includes means for calculating the current achievable uplink throughput using the short BSR based at least in part on the maximum buffer size indication in the short BSR and a BSR network delay.

In some aspects, the UE 120 includes means for calculating the BSR network delay based at least in part on a periodic BSR timer and a BSR-to-physical uplink shared channel (PUSCH) delay.

In some aspects, the base station 110 includes means for receiving, from a UE with a single LCG that has uplink data to be transmitted, a long BSR that indicates a current buffer size of the single LCG; and/or means for selectively activating an uplink option for the UE based at least in part on the current buffer size indicated in the long BSR. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for activating the uplink option for the UE based at least in part on a determination that the current buffer size indicated in the long BSR satisfies a threshold.

In some aspects, the base station 110 includes means for activating an uplink split bearer for the UE based at least in part on the determination that the current buffer size indicated in the long BSR satisfies the threshold.

In some aspects, the base station 110 includes means for activating uplink grants for an additional leg of an uplink slit bearer for the UE based at least in part on the determination that the current buffer size indicated in the long BSR satisfies the threshold, wherein the additional leg is at least one of a primary cell group path or a secondary cell group path.

In some aspects, the base station 110 includes means for activating uplink carrier aggregation for the UE based at least in part on the determination that the current buffer size indicated in the long BSR satisfies the threshold.

In some aspects, the base station 110 includes means for transmitting, to the UE, an indication to switch from a first bandwidth part to a second bandwidth part based at least in part on the determination that the current buffer size indicated in the long BSR satisfies the threshold.

In some aspects, the base station 110 includes means for transmitting, to the UE, an indication to increase a number of layers to be multiplexed in an uplink communication from the UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may a transmit a BSR to a base station to indicate to the base station that the UE has uplink data to be transmitted. A BSR is a type of medium access control (MAC) control element (MAC-CE) that carries information that indicates how much data is in a buffer of the UE. A BSR may be a short BSR or a long BSR. In NR, for regular BSR and periodic BSR, a UE uses the long BSR only when the UE has multiple LCGs with uplink data to be transmitted. When there are not multiple LCGs with uplink data available to be transmitted (e.g., only a single LCG with uplink data to be transmitted), the UE uses the short BSR. An LCG is a combination of radio bearers for which the UE reports and aggregates buffer status. For example, a UE may be configured with multiple LCGs that are used for transmitting different types of traffic (e.g., data, Internet multimedia subsystem (IMS) voice and/or video data, and/or virtual reality (VR) data, among other examples).

A BSR may include a buffer size field that carries an index that indicates a current buffer size for a buffer of a UE. The current buffer size refers to a current amount of data (e.g., in bytes) in the buffer (e.g., amount of data available to be transmitted). Index values in the buffer size field may correspond to different ranges of buffer sizes. For example, a wireless communication standard (e.g., 3GPP standard) may define a mapping of index values to ranges of buffer size values. The buffer size field in the short BSR may be smaller than the buffer size field in the long BSR. For example, the buffer size field in the short BSR may include 5 bits, and the buffer size field in the long BSR may include 8 bits. In this case, the maximum index value that can be indicated in the short BSR may be 31, and the maximum index value that can be indicated in the long BSR may be 254. Accordingly, the long BSR may be capable of indicating much larger buffer sizes that the short BSR. For example, in an NR MAC protocol specification 38.321, the maximum index value of 31 in the short BSR indicates that the current buffer size is greater than 150 kilobytes (kB), whereas the maximum value of 254 in the long BSR indicates that the current buffer size is greater than 81 megabytes (MB).

In some cases, a base station may rely on information in a BSR in determining whether to enable uplink grants for a UE on multiple cell groups in dual connectivity. In dual connectivity, such as Evolved Universal Terrestrial Radio Access Network (E-UTRAN) NR Dual Connectivity (EN-DC) or NR Dual Connectivity (NR-DC), the UE may transmit and receive data on multiple component carriers from two cell groups via a master node (MN) and a secondary node (SN). A master cell group (MCG) is a group of serving cells associated with the MN, and a secondary cell group (SCG) is a group of serving cells associated with the SN. In some cases, a split bearer, which splits traffic between a primary path (e.g., MCG path) and a secondary path (e.g., SCG path), may be configured for UE. In the case of an uplink split bearer, a threshold may be used to determine whether the secondary path can report a BSR. In this case, the base station may enable uplink grants on the secondary path when the current buffer size indicated in the reported BSR satisfies the threshold. However, the threshold value may be limited due to the maximum buffer size that can be indicated using the short BSR (e.g., 150 kB). This may result in the threshold being set at too low of a value, which may cause inefficient scheduling using both the primary and secondary path in cases in which both paths are not needed.

Furthermore, the maximum buffer size that can be indicated using the short BSR (e.g., 150 kB) may limit the uplink data rate and the uplink throughput for the UE. For example, the UE may have much more data to be transmitted than the maximum buffer size that can be indicated using the short BSR. In this case, a base station, based on the current buffer size indicated in the short BSR, may grant too few uplink resources for the UE to achieve a configured uplink throughput. This may result in increased latency of uplink traffic, decreased uplink throughput, and inefficient allocation of network resources.

Some techniques and apparatuses described herein enable a UE to use long BSR to increase uplink throughput. In some aspects, a UE may detect a trigger for transmitting a BSR, and the UE may transmit a long BSR for a single LCG with data to be transmitted based at least in part on a determination that a current buffer size for the single LCG is greater than a maximum buffer size indication in a short BSR and/or a determination that a current achievable uplink throughput using the short BSR is less than a configured uplink throughput. Accordingly, the UE may provide a more accurate indication of the current buffer level for the LCG in a case in which the current buffer level is greater than the maximum buffer size indication in the short BSR. As a result, latency of uplink traffic for the UE may be decreased, uplink throughput may be increased, and network resources may be allocated more efficiently.

Figure 3:
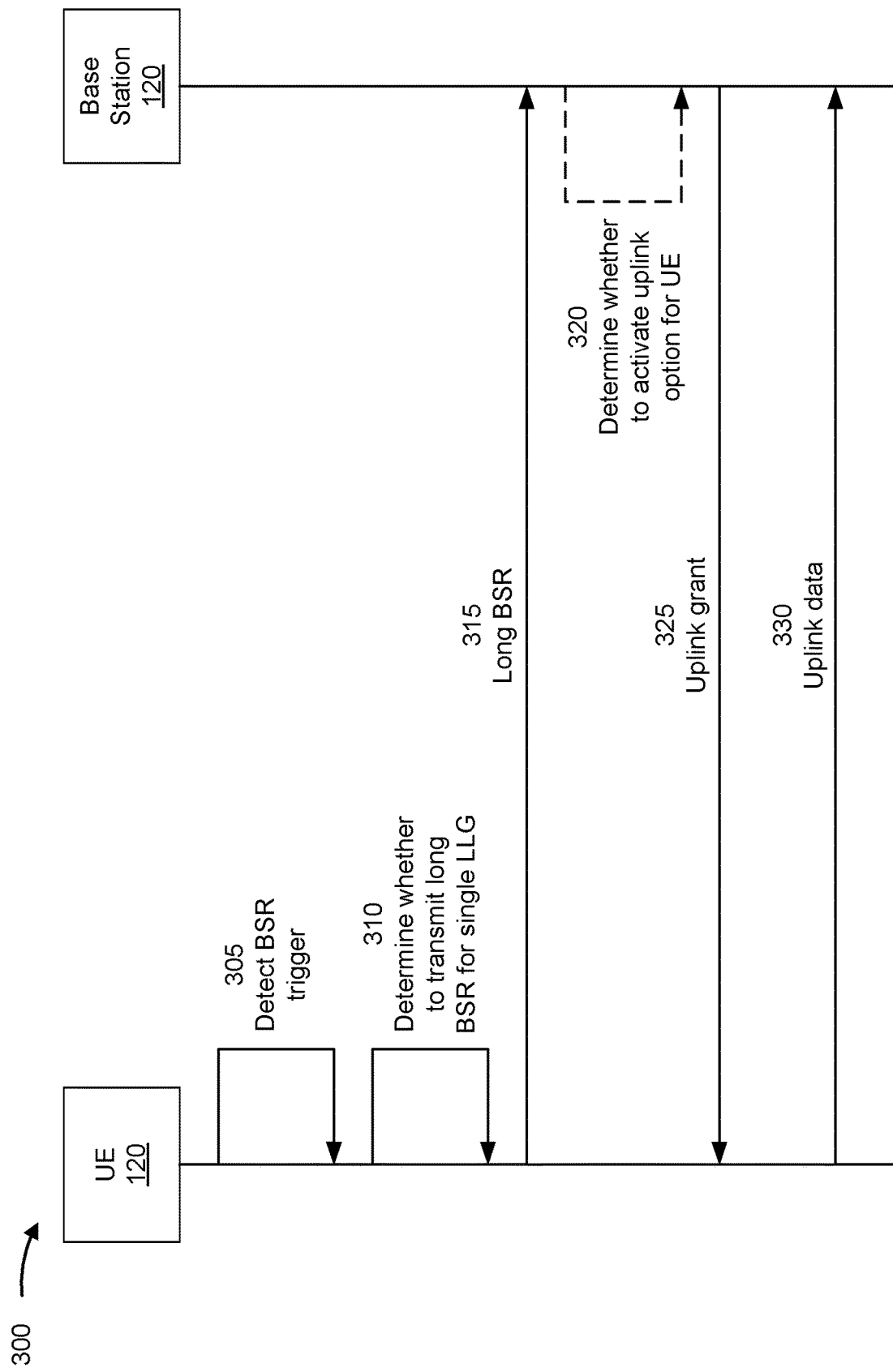

FIG. 3 is a diagram illustrating an example 300 associated with long BSR usage to increase throughput, in accordance with the present disclosure. As shown in FIG. 3, example 300 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 3, and by reference number 305, the UE 120 may detect a BSR trigger. The BSR trigger may be any event or occurrence that triggers transmission of a BSR by the UE 120. In some aspects, BSR trigger may be associated with data to be transmitted by the UE 120 arriving in a buffer of an LCG. For example, the UE 120 may detect the BSR trigger based at least in part on detecting the arrival of data to be transmitted in a previously empty buffer of an LCG.

In some aspects, the UE 120 may detect the BSR trigger based on expiration of a periodic BSR timer. The periodic BSR timer may trigger transmission of BSR for sustained traffic in a buffer of an LCG. For example, the UE 120 may start the periodic BSR timer when the UE 120 transmits a previous BSR, and the UE 120 may detect the BSR trigger based on detecting that the periodic BSR time has expired and data to be transmitted remains in the buffer of the LCG.

In some aspects, the UE 120 may detect the BSR trigger based on expiration of a re-transmission BSR timer with data to be transmitted remaining in the buffer of the LCG. For example, the UE 120 may start the re-transmission BSR timer when the UE 120 transmits a BSR, and the UE 120 may stop and reset the re-transmission BSR timer based on receiving an uplink grant from the base station 110. The re-transmission BSR timer may trigger the UE 120 to re-transmit the BSR if the re-transmission BSR timer expires prior to the UE 120 receiving an uplink grant.

As further shown in FIG. 3, and by reference number 310, the UE 120 may determine whether to transmit a long BSR for a single LCG with data to be transmitted. For example, in a case in which the UE 120 detects the BSR trigger and the UE 120 determines that a single LCG of the UE 120 has data to be transmitted (e.g., data in the buffer for the LCG), the UE 120 may determine whether to transmit the long BSR for the single LCG with data to be transmitted.

In some aspects, the UE 120 may determine whether to transmit the long BSR for the single LCG with data to be transmitted based at least in part on a determination of whether a current buffer size for the LCG is greater than a maximum buffer size indication in the short BSR. The current buffer size for the LCG is the amount of data to be transmitted in the buffer for the LCG. The maximum buffer size indication in the short BSR may be a buffer size associated with a maximum index that can be indicated in a buffer size field of the short BSR. For example, in a case in which the maximum index (e.g., 31) for the short BSR maps to a buffer size range of greater than 150 kB, the maximum buffer size indication in the short BSR is 150 kB. The UE 120 may determine the current buffer size for the LCG, and the UE 120 may compare the current buffer size for the LCG with the maximum buffer size indication in the short BSR to determine whether the current buffer size for the LCG is greater than the maximum buffer size indication in the short BSR.

In some aspects, the UE 120 may determine whether to transmit the long BSR for the single LCG with data to be transmitted based at least in part on a determination of whether a current achievable uplink throughput using the short BSR is less than a configured uplink throughput. For example, in a case in which the current achievable uplink throughput using the short BSR is less than the configured uplink throughput, the UE 120 may determine that the short BSR cannot support the configured uplink throughput over the network delay duration. The configured uplink throughput may be a peak throughput achievable for the UE 120 based on a radio resource control (RRC) configuration. For example, the RRC configuration that configures the configured uplink throughput for the UE 120 may be transmitted to UE 120 by the base station 110. The UE 120 may calculate the current achievable uplink throughput using the short BSR based at least in part on the maximum buffer size indication in the short BSR and a BSR network delay. For example, the UE 120 may calculate the achievable uplink throughput using the short BSR by dividing the maximum buffer size indication in the short BSR by the BSR network delay.

The BSR network delay may represent an amount of time covered by a BSR that is transmitted to the base station 110. The UE 120 may calculate the BSR network delay based on periodic BSR time duration (p-BSR duration) and a BSR-to-PUSCH delay. For example, the UE 120 may calculate the BSR network delay as: BSR network delay=p-BSR duration+(BSR-to-PUSCH delay−1) slots. In this case, the p-BSR duration may be in milliseconds and the BSR-to-PSCH delay may be in slots, so the UE 120 may convert the BSR-to-PUSCH delay from slots to milliseconds. The BSR-to-PUSCH delay may represent an amount of time between the UE 120 transmitting the BSR to the base station 110 and the UE 120 transmitting uplink data in a PUSCH communication based on an uplink grant received from the base station 110. In some aspects, the UE 120 may calculate the BSR-to-PUSCH delay based on a BSR decoding delay and a K2 parameter. For example, the UE 120 may calculate the BSR-to-PUSCH delay as: BSR-to-PUSCH delay=BSR decoding delay+K2. The BSR decoding delay may be an amount of time associated with the base station 110 decoding the BSR transmitted from the UE 120. The K2 parameter may be a downlink control information (DCI)-to-PUSCH delay corresponding to an amount of time between the base station 110 transmitting DCI including the uplink grant and the PUSCH communication transmitted by the UE 120. In some aspects, the UE 120 may determine the BSR-to-PUSCH delay based at least in part on delay measurements at the UE 120 associated with one or more previous BSR transmissions. For example, the UE 120 may calculate the BSR-PUSCH delay based at least in part on measurements, for the one or more previous BSRs, of a delay from the slot in which BSR is transmitted by the UE 120 to a slot in which a corresponding PUSCH communication is transmitted by the UE 120.

In some aspects, the UE 120 may determine to transmit the long BSR for the single LCG based at least in part on determining that the current buffer size for the single LCG is greater than the maximum buffer size indication in the short BSR, and the current achievable uplink throughput using the short BSR is less than the configured uplink throughput. In some aspects, the UE 120 may determine to transmit the long BSR for the single LCG based at least in part on determining that the current buffer size for the single LCG is greater than the maximum buffer size indication in the short BSR or based at least in part on determining that the current achievable uplink throughput using the short BSR is less than the configured uplink throughput.

As further shown in FIG. 3, and by reference number 315, the UE 120 may transmit, to the base station 110, the long BSR for the single LCG with data to be transmitted. For example, the UE 120 may transmit the long BSR for the single LCG with data to be transmitted based at least in part on the determination that the current buffer size for the single LCG is greater than the maximum buffer size indication in the short BSR and/or the determination that the current achievable uplink throughput using the short BSR is less than the configured uplink throughput. The long BSR may include, in a buffer size field of the long BSR, an index that indicates the current buffer size for the single LCG with data to be transmitted. For example, the index may map to buffer size ranges that include the current buffer size for the LCG.

In some aspects, the long BSR may include a first index that indicates the current buffer size of the single LCG with data to be transmitted and a second index indicating a nominal value (e.g., 1) for a buffer size of another LCG that does not have data to be transmitted. In this case, the second index may act as "dummy BSR" for the LCG that does not have data to be transmitted to prevent the base station 110 from rejecting the long BSR for not reporting data for multiple LCGs. In some aspects, the UE 120 may include the second index for an LCG without data to be transmitted based on the LCG without data to be transmitted being configured for the UE 120 by the base station 110 or another network device. In some aspects, the UE 120 may include the second index for an LCG without data to be transmitted even when the LCG without data to be transmitted is not an LCG that is already configured for the UE 120.

As further shown in FIG. 3, and by reference number 320, in some aspects, the base station 110 may determine whether to activate an uplink option for the UE 120 based at least in part on receiving the long BSR. In some aspects, the base station 110 may selectively activate and/or enable an uplink option, such as a dual connectivity or carrier aggregation uplink option, based on a comparison of the current buffer size (for the single LCG with data to be transmitted) indicated in the long BSR and a threshold. In some aspects, the threshold may be set to a value that is greater than the maximum buffer size indication in the short BSR.

In some aspects, the base station 110 may activate dual connectivity for the UE 120 and/or activate an uplink split bearer for the UE 120 based at least in part on determining that the current buffer size indicated in the long BSR satisfies the threshold. In some aspects, the UE 120 may be in dual connectivity, and the base station 110 may activate uplink grants for an additional leg (e.g., in addition to a current leg/path) of an uplink split bearer for the UE 120 based at least in part on determining that the current buffer size indicated in the long BSR satisfies the threshold. For example, the additional leg may be a primary path (e.g., PCG path) or a secondary path (e.g., SCG path). In this case, the UE 120 may begin reporting BSR on the additional leg (in addition to the current leg), and the base station 110 may begin transmitting uplink grants for PUSCH communications on the additional leg. In some aspects, the base station 110 may determine a delay associated the additional leg, and the uplink grants on the additional leg may be based at least in part on the delay associated with the additional leg. For example, the delay associated with the additional leg may be a delay for signaling between the MN and the SN (e.g., an eNB to gNB X2 based delay).

In some aspects, the base station 110 may configure carrier aggregation for the UE 120 and/or activate carrier aggregation for the UE 120 based at least in part on determining that the current buffer size indicated in the long BSR satisfies the threshold. In some aspects, the base station 110 may initiate bandwidth part (BWP) switching for the UE 120 based at least in part on determining that the current buffer size indicated in the long BSR satisfies the threshold. For example, the base station 110 may transmit, to the UE 120, and indication to switch from a first BWP to a second BWP, based at least in part on determining that the current buffer size indicated in the long BSR satisfies the threshold. In this case, the second BWP may have a higher bandwidth than the first BWP. In some aspects, the base station 110 may increase the number of layers to be multiplexed for uplink communications from the UE 120 based at least in part on determining that the current buffer size indicated in the long BSR satisfies the threshold. For example, the base station 110 may transmit, to the UE 120, an indication to increase the number of layers to be multiplexed in one or more uplink communications from the UE 120.

As further shown in FIG. 3, and by reference number 325, the base station 110 may transmit, to the UE 120, an uplink grant based at least in part on the long BSR. For example, the base station 110 may transmit, to the UE 120, uplink grant DCI in a physical downlink control channel (PDCCH) communication. The uplink grant may schedule resources for transmitting uplink data by the UE 120. The base station 110 may determine the amount of resources for the uplink grant based at least in part on the current buffer size indicated in the long BSR.

As further shown in FIG. 3, and by reference number 330, the UE 120 may transmit, to the base station 110, uplink data based at least in part on the uplink grant received from the base station 110. For example, the UE 120 may transmit the uplink data in PUSCH communication in the resources scheduled in the uplink grant.

As described above in connection with FIG. 3, the UE 120 may detect a trigger for transmitting a BSR, and the UE 120 may transmit a long BSR for a single LCG with data to be transmitted based at least in part on a determination that a current buffer size for the single LCG is greater than a maximum buffer size indication in a short BSR and/or a determination that a current achievable uplink throughput using the short BSR is less than a configured uplink throughput. Accordingly, the UE 120 may provide a more accurate indication of the current buffer level for the LCG in a case in which the current buffer level is greater than the maximum buffer size indication in the short BSR. As a result, latency of uplink traffic for the UE may be decreased, uplink throughput may be increased, and network resources may be allocated more efficiently.

As indicated above, FIG. 3 is provided as an example. Other examples may differ from what is described with respect to FIG. 3.

FIG. 4 is a diagram illustrating an example 400 associated with long BSR usage to increase throughput, in accordance with the present disclosure. As shown in FIG. 4, example 400 shows uplink throughput gains associated with a UE using a long BSR for a single LCG with data to be transmitted. In example 400, throughput gains for various configured uplink throughput values are shown for a 12 ms network delay and a 2 ms network delay. The current achievable throughput values in example 400 show the current achievable uplink throughput using the short BSR, and are calculated, as described above, using the network delay and a maximum buffer size indication in a short BSR of 150 kB. As shown by the throughput gains in example 400, using the long BSR resulting in the UE achieving the configured uplink throughput for all cases in which the current achievable throughput using the short BSR is less than the configured uplink throughput.

As indicated above, FIG. 4 is provided as an example. Other examples may differ from what is described with respect to FIG. 4.

Figure 5:
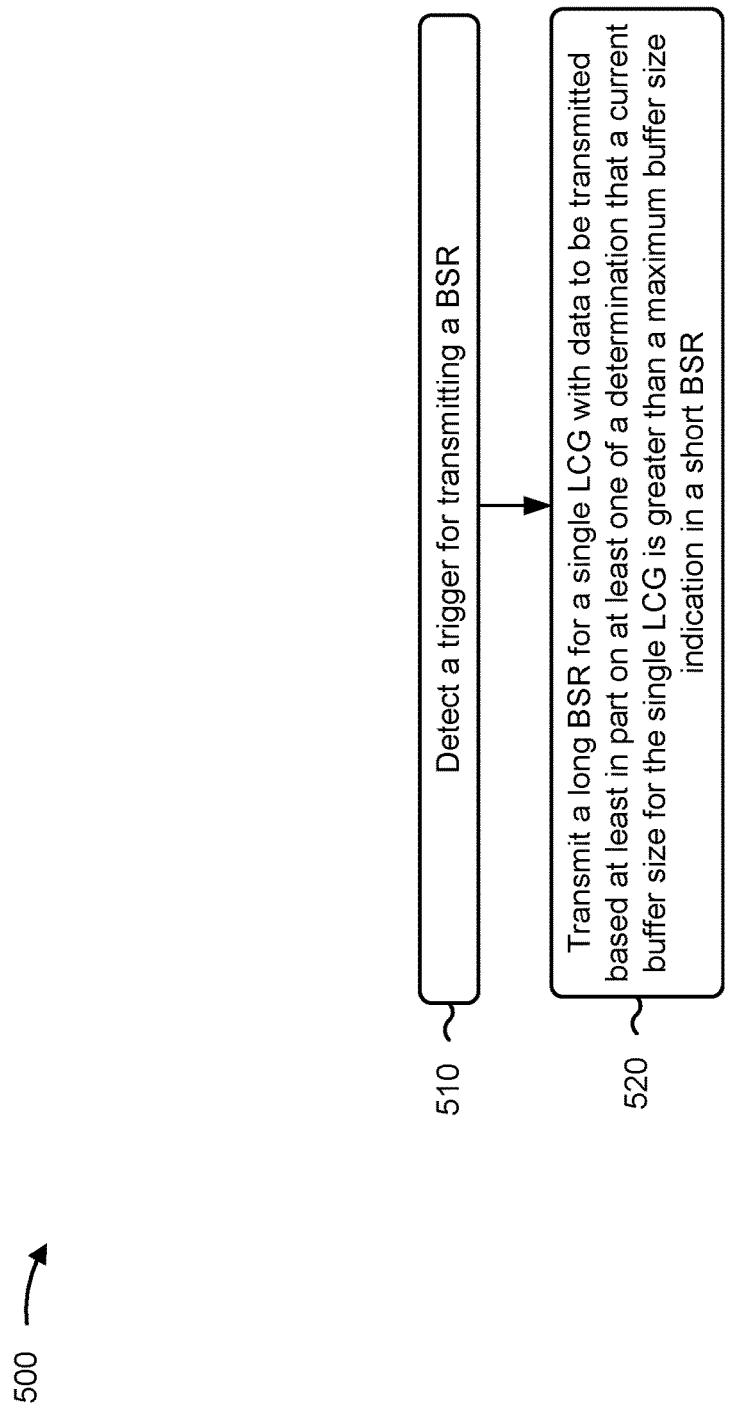
FIGS. 5-6 are diagrams illustrating example processes associated with long BSR usage to increase throughput, in accordance with the present disclosure.

FIG. 5 is a diagram illustrating an example process 500 performed, for example, by a UE, in accordance with the present disclosure. Example process 500 is an example where the UE (e.g., UE 120) performs operations associated with long BSR usage to increase throughput.

As shown in FIG. 5, in some aspects, process 500 may include detecting a trigger for transmitting a BSR (block 510). For example, the UE (e.g., using detection component 708, depicted in FIG. 7) may detect a trigger for transmitting a BSR, as described above.

As further shown in FIG. 5, in some aspects, process 500 may include transmitting, to a base station, a long BSR for a single LCG with data to be transmitted based at least in part on at least one of a determination that a current buffer size for the single LCG is greater than a maximum buffer size indication in a short BSR (block 520). For example, the UE (e.g., using transmission component 704, depicted in FIG. 7) may transmit, to a base station, a long BSR for a single LCG with data to be transmitted based at least in part on at least one of a determination that a current buffer size for the single LCG is greater than a maximum buffer size indication in a short BSR, as described above.

Process 500 may include additional aspects, such as any single aspect or any combination of aspects described below and/or in connection with one or more other processes described elsewhere herein.

In a first aspect, transmitting the long BSR for the single LCG includes transmitting the long BSR for the single LCG based at least in part the determination that the current buffer size for the single LCG is greater than the maximum buffer size indication in the short BSR and based at least in part on a determination that a current achievable uplink throughput using the short BSR is less than a configured uplink throughput.

In a second aspect, alone or in combination with the first aspect, process 500 further includes calculating the current achievable uplink throughput using the short BSR based at least in part on the maximum buffer size indication in the short BSR and a BSR network delay.

In a third aspect, alone or in combination with one or more of the first and second aspects, calculating the current achievable uplink throughput using the short BSR includes calculating the BSR network delay based at least in part on a periodic BSR timer and a BSR-to-PUSCH delay.

In a fourth aspect, alone or in combination with one or more of the first through third aspects, the BSR-to-PUSCH delay is based at least in part on a BSR decoding delay and a DCI-to-PUSCH delay parameter.

In a fifth aspect, alone or in combination with one or more of the first through fourth aspects, the configured uplink throughput is configured via a radio resource control configuration.

In a sixth aspect, alone or in combination with one or more of the first through fifth aspects, the long BSR includes a first index that indicates the current buffer size of the single LCG with data to be transmitted and a second index indicating a nominal value for a buffer size of another LCG.

In a seventh aspect, alone or in combination with one or more of the first through sixth aspects, the other LCG is a configured LCG for the UE.

In an eighth aspect, alone or in combination with one or more of the first through sixth aspects, the other LCG is not a configured LCG for the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
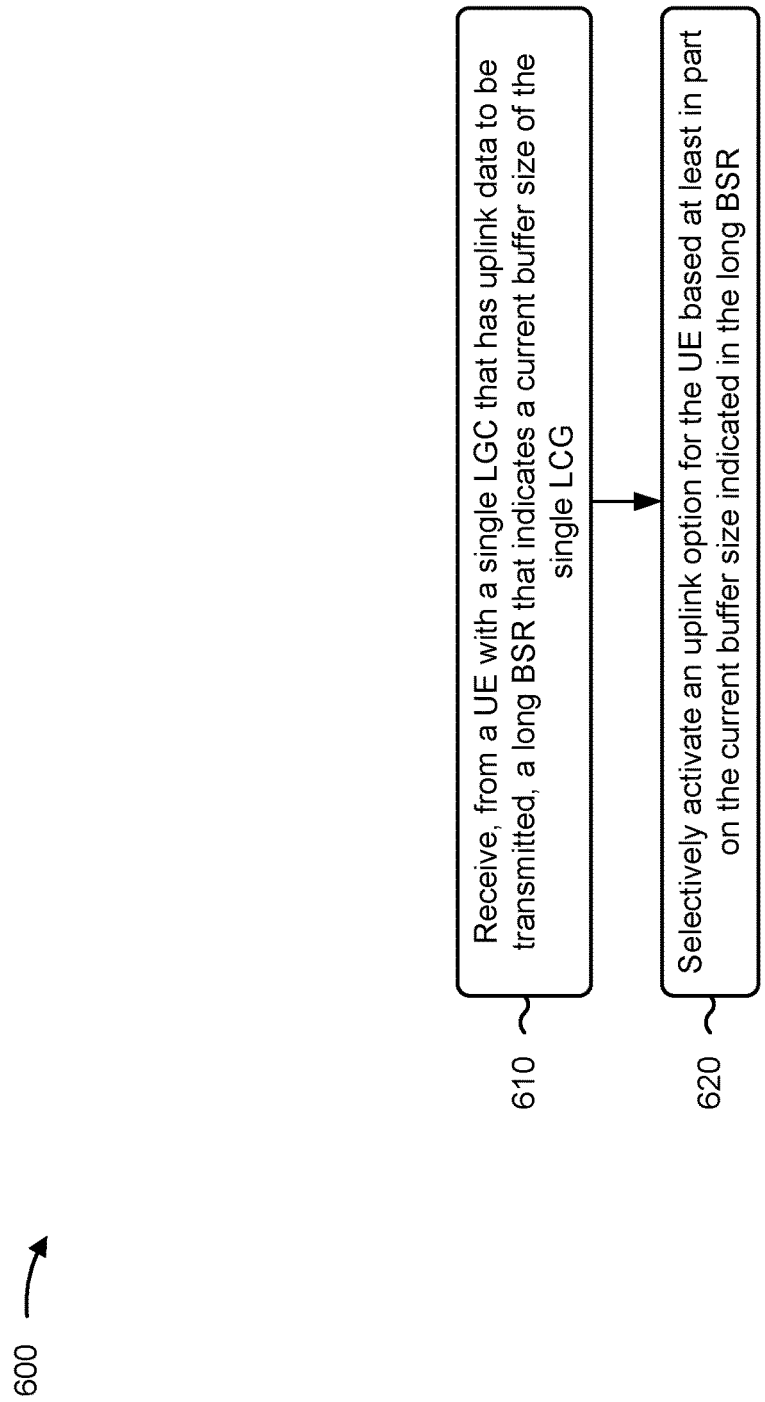

FIG. 6 is a diagram illustrating an example process 600 performed, for example, by a base station, in accordance with the present disclosure. Example process 600 is an example where the base station (e.g., base station 110) performs operations associated with long BSR usage to increase throughput.

As shown in FIG. 6, in some aspects, process 600 may include receiving, from a UE with a single LCG that has uplink data to be transmitted, a long BSR that indicates a current buffer size of the single LCG (block 610). For example, the base station (e.g., using reception component 802, depicted in FIG. 8) may receive, from a UE with a single LCG that has uplink data to be transmitted, a long BSR that indicates a current buffer size of the single LCG, as described above.

As further shown in FIG. 6, in some aspects, process 600 may include selectively activating an uplink option for the UE based at least in part on the current buffer size indicated in the long BSR (block 620). For example, the base station (e.g., using activation component 808, depicted in FIG. 8) may selectively activate an uplink option for the UE based at least in part on the current buffer size indicated in the long BSR, as described above.

Process 600 may include additional aspects, such as any single aspect or any combination of aspects described below and/or in connection with one or more other processes described elsewhere herein.

In a first aspect, selectively activating the uplink option for the UE includes activating the uplink option for the UE based at least in part on a determination that the current buffer size indicated in the long BSR satisfies a threshold.

In a second aspect, alone or in combination with the first aspect, the threshold is greater than a maximum buffer size indication in a short BSR.

In a third aspect, alone or in combination with one or more of the first and second aspects, activating the uplink option for the UE includes activating an uplink split bearer for the UE based at least in part on the determination that the current buffer size indicated in the long BSR satisfies the threshold.

In a fourth aspect, alone or in combination with one or more of the first through third aspects, activating the uplink option for the UE includes activating uplink grants for an additional leg of an uplink slit bearer for the UE based at least in part on the determination that the current buffer size indicated in the long BSR satisfies the threshold, and the additional leg is at least one of a primary cell group path or a secondary cell group path.

In a fifth aspect, alone or in combination with one or more of the first through fourth aspects, the uplink grants are based at least in part on a delay associated with the additional leg of the uplink split bearer.

In a sixth aspect, alone or in combination with one or more of the first through fifth aspects, activating the uplink option for the UE includes activating uplink carrier aggregation for the UE based at least in part on the determination that the current buffer size indicated in the long BSR satisfies the threshold.

In a seventh aspect, alone or in combination with one or more of the first through sixth aspects, activating the uplink option for the UE includes transmitting, to the UE, an indication to switch from a first bandwidth part to a second bandwidth part based at least in part on the determination that the current buffer size indicated in the long BSR satisfies the threshold.

In an eighth aspect, alone or in combination with one or more of the first through seventh aspects, activating the uplink option for the UE includes transmitting, to the UE, an indication to increase a number of layers to be multiplexed in an uplink communication from the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
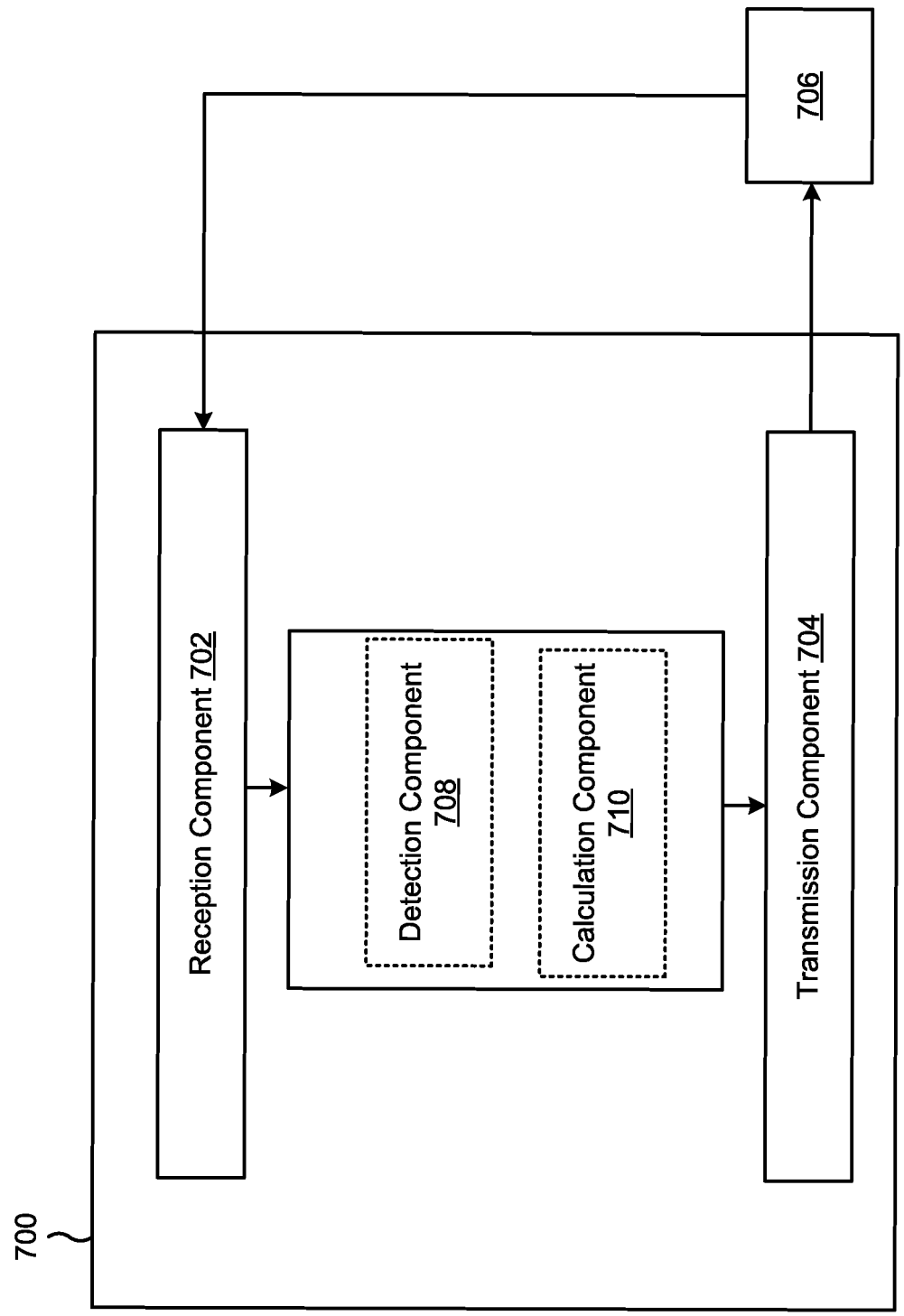
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a detection component 708 or a calculation component 710, among other examples.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The detection component 708 may detect a trigger for transmitting a BSR. The transmission component 704 may transmit, to a base station, a long BSR for a single LCG with data to be transmitted based at least in part on at least one of a determination that a current buffer size for the single LCG is greater than a maximum buffer size indication in a short BSR.

The calculation component 710 may calculate the current achievable uplink throughput using the short BSR based at least in part on the maximum buffer size indication in the short BSR and a BSR network delay.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
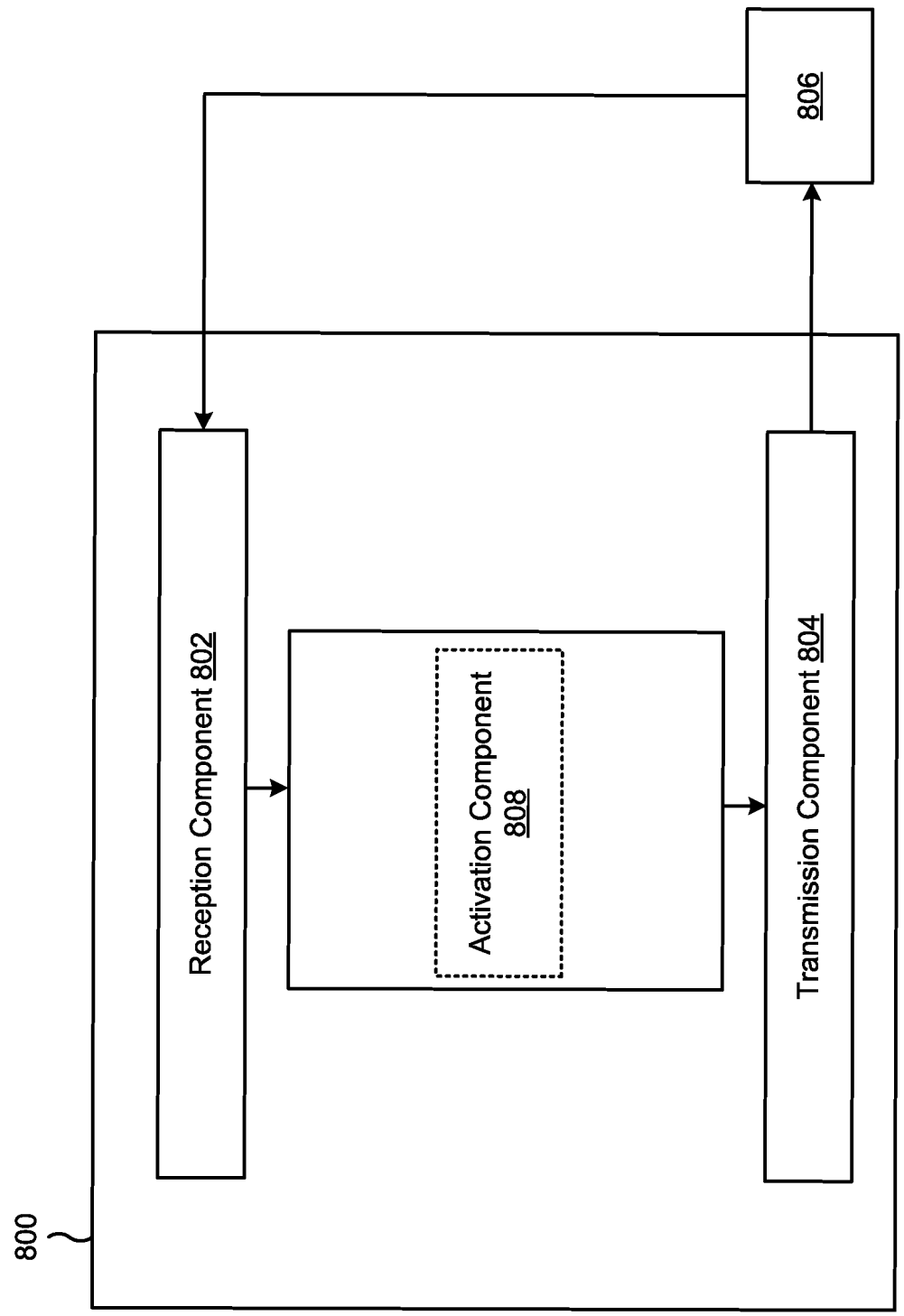

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include an activation component 808, among other examples.

In some aspects, the apparatus 800 may be configured to perform one or more operations described herein in connection with FIGS. 3-4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The reception component 802 may receive, from a UE with a single LCG that has uplink data to be transmitted, a long BSR that indicates a current buffer size of the single LCG. The activation component 808 may selectively activate an uplink option for the UE based at least in part on the current buffer size indicated in the long BSR.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: detecting a trigger for transmitting a buffer status report (BSR); and transmitting, to a base station, a long BSR for a single logical channel group (LCG) with data to be transmitted based at least in part on at least one of a determination that a current buffer size for the single LCG is greater than a maximum buffer size indication in a short BSR.

Aspect 2: The method of Aspect 1, wherein transmitting the long BSR for the single LCG comprises: transmitting the long BSR for the single LCG based at least in part the determination that the current buffer size for the single LCG is greater than the maximum buffer size indication in the short BSR and based at least in part on a determination that a current achievable uplink throughput using the short BSR is less than a configured uplink throughput.

Aspect 3: The method of Aspect 2, further comprising: calculating the current achievable uplink throughput using the short BSR based at least in part on the maximum buffer size indication in the short BSR and a BSR network delay.

Aspect 4: The method of Aspect 3, wherein calculating the current achievable uplink throughput using the short BSR comprises: calculating the BSR network delay based at least in part on a periodic BSR timer and a BSR-to-physical uplink shared channel (PUSCH) delay.

Aspect 5: The method of Aspect 4, wherein the BSR-to-PUSCH delay is based at least in part on a BSR decoding delay and a downlink control information (DCI)-to-PUSCH delay parameter.

Aspect 6: The method of any of Aspects 2-5, wherein the configured uplink throughput is configured via a radio resource control configuration.

Aspect 7: The method of any of Aspects 1-6, wherein the long BSR includes a first index that indicates the current buffer size of the single LCG with data to be transmitted and a second index indicating a nominal value for a buffer size of another LCG.

Aspect 8: The method of Aspect 7, wherein the other LCG is a configured LCG for the UE.

Aspect 9: The method of Aspect 7, wherein the other LCG is not a configured LCG for the UE.

Aspect 10: A method of wireless communication performed by a base station, comprising: receiving, from a user equipment (UE) with a single logical channel group (LCG) that has uplink data to be transmitted, a long buffer status report (BSR) that indicates a current buffer size of the single LCG; and selectively activating an uplink option for the UE based at least in part on the current buffer size indicated in the long BSR.

Aspect 11: The method of Aspect 10, wherein selectively activating the uplink option for the UE comprises: activating the uplink option for the UE based at least in part on a determination that the current buffer size indicated in the long BSR satisfies a threshold.

Aspect 12: The method of Aspect 11, wherein the threshold is greater than a maximum buffer size indication in a short BSR.

Aspect 13: The method of any of Aspects 11-12, wherein activating the uplink option for the UE comprises: activating an uplink split bearer for the UE based at least in part on the determination that the current buffer size indicated in the long BSR satisfies the threshold.

Aspect 14: The method of any of Aspects 11-13, wherein activating the uplink option for the UE comprises: activating uplink grants for an additional leg of an uplink slit bearer for the UE based at least in part on the determination that the current buffer size indicated in the long BSR satisfies the threshold, wherein the additional leg is at least one of a primary cell group path or a secondary cell group path.

Aspect 15: The method of Aspect 14, wherein the uplink grants are based at least in part on a delay associated with the additional leg of the uplink split bearer.

Aspect 16: The method of any of Aspects 11-15, wherein activating the uplink option for the UE comprises: activating uplink carrier aggregation for the UE based at least in part on the determination that the current buffer size indicated in the long BSR satisfies the threshold.

Aspect 17: The method of any of Aspects 11-16, wherein activating the uplink option for the UE comprises: transmitting, to the UE, an indication to switch from a first bandwidth part to a second bandwidth part based at least in part on the determination that the current buffer size indicated in the long BSR satisfies the threshold.

Aspect 18: The method of any of Aspects 11-17, wherein activating the uplink option for the UE comprises: transmitting, to the UE, an indication to increase a number of layers to be multiplexed in an uplink communication from the UE.

Aspect 19: An apparatus for wireless communication at a device, comprising a processor; memory coupled with the processor; and instructions stored in the memory and executable by the processor to cause the apparatus to perform the method of one or more Aspects of Aspects 1-9.

Aspect 20: An apparatus for wireless communication at a device, comprising a processor; memory coupled with the processor; and instructions stored in the memory and executable by the processor to cause the apparatus to perform the method of one or more Aspects of Aspects 10-18.

Aspect 21: A device for wireless communication, comprising a memory and one or more processors coupled to the memory, the memory and the one or more processors configured to perform the method of one or more Aspects of Aspects 1-9.

Aspect 22: A device for wireless communication, comprising a memory and one or more processors coupled to the memory, the memory and the one or more processors configured to perform the method of one or more Aspects of Aspects 10-18.

Aspect 23: An apparatus for wireless communication, comprising at least one means for performing the method of one or more Aspects of Aspects 1-9.

Aspect 24: An apparatus for wireless communication, comprising at least one means for performing the method of one or more Aspects of Aspects 10-18

Aspect 25: A non-transitory computer-readable medium storing code for wireless communication, the code comprising instructions executable by a processor to perform the method of one or more Aspects of Aspects 1-9.

Aspect 26: A non-transitory computer-readable medium storing code for wireless communication, the code comprising instructions executable by a processor to perform the method of one or more Aspects of Aspects 10-18.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-9.

Aspect 28: A non-transitory computer-readable medium storing a set of instructions for wireless communication, the set of instructions comprising one or more instructions that, when executed by one or more processors of a device, cause the device to perform the method of one or more Aspects of Aspects 10-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    detecting a trigger for transmitting a buffer status report (BSR); and
    transmitting, to a network entity, a long BSR for a single logical channel group (LCG) with data to be transmitted based at least in part on a determination that a current buffer size for the single LCG is greater than a maximum buffer size indication in a short BSR and that a current achievable uplink throughput using the short BSR is less than a configured uplink throughput.

2. The method of claim 1, further comprising:
    calculating the current achievable uplink throughput using the short BSR based at least in part on the maximum buffer size indication in the short BSR and a BSR network delay.

3. The method of claim 2, wherein calculating the current achievable uplink throughput using the short BSR comprises:
    calculating the BSR network delay based at least in part on a periodic BSR timer and a BSR-to-physical uplink shared channel (PUSCH) delay.

4. The method of claim 3, wherein the BSR-to-PUSCH delay is based at least in part on a BSR decoding delay and a downlink control information (DCI)-to-PUSCH delay parameter.

5. The method of claim 1, wherein the configured uplink throughput is configured via a radio resource control configuration.

6. The method of claim 1, wherein the long BSR includes a first index that indicates the current buffer size of the single LCG with data to be transmitted and a second index indicating a nominal value for a buffer size of a second LCG.

7. The method of claim 6, wherein the second LCG is a configured LCG for the UE.

8. The method of claim 6, wherein the second LCG is not a configured LCG for the UE.

9. A method of wireless communication performed by a network entity, comprising:
    receiving, from a user equipment (UE) with a single logical channel group (LCG) that has uplink data to be transmitted, a long buffer status report (BSR) that indicates a current buffer size of the single LCG; and
    activating an uplink option for the UE based at least in part on a determination that the current buffer size indicated in the long BSR satisfies a threshold.

10. The method of claim 9, wherein the threshold is greater than a maximum buffer size indication in a short BSR.

11. The method of claim 9, wherein activating the uplink option for the UE comprises:
    activating an uplink split bearer for the UE based at least in part on the current buffer size indicated in the long BSR.

12. The method of claim 9, wherein activating the uplink option for the UE comprises:
    activating uplink grants for an additional leg of an uplink split bearer for the UE based at least in part on least in part on the current buffer size indicated in the long BSR, wherein the additional leg is at least one of a primary cell group path or a secondary cell group path.

13. The method of claim 12, wherein the uplink grants are based at least in part on least in part on a delay associated with the additional leg of the uplink split bearer.

14. The method of claim 9, wherein activating the uplink option for the UE comprises:
    activating uplink carrier aggregation for the UE based at least in part on the current buffer size indicated in the long BSR.

15. The method of claim 9, wherein activating the uplink option for the UE comprises:
    transmitting, to the UE, an indication to switch from a first bandwidth part to a second bandwidth part based at least in part on the current buffer size indicated in the long BSR.

16. The method of claim 9, wherein activating the uplink option for the UE comprises:
    transmitting, to the UE, an indication to increase a number of layers to be multiplexed in an uplink communication from the UE.

17. A user equipment (UE) for wireless communication, comprising:
    a memory; and
    one or more processors coupled to the memory, the one or more processors configured to:
        detect a trigger for transmitting a buffer status report (BSR); and
        transmit, to a network entity, a long BSR for a single logical channel group (LCG) with data to be transmitted based at least in part on a determination that a current buffer size for the single LCG is greater than a maximum buffer size indication in a short BSR and that a current achievable uplink throughput using the short BSR is less than a configured uplink throughput.

18. The UE of claim 17, wherein the one or more processors are further configured to:
calculate the current achievable uplink throughput using the short BSR based at least in part on the maximum buffer size indication in the short BSR and a BSR network delay.

19. The UE of claim 18, wherein the one or more processors, when calculating the current achievable uplink throughput using the short BSR, are configured to:
calculate the BSR network delay based at least in part on a periodic BSR timer and a BSR-to-physical uplink shared channel (PUSCH) delay.

20. The UE of claim 19, wherein the BSR-to-PUSCH delay is based at least in part on a BSR decoding delay and a downlink control information (DCI)-to-PUSCH delay parameter.

21. The UE of claim 17, wherein the configured uplink throughput is configured via a radio resource control configuration.

22. The UE of claim 17, wherein the long BSR includes a first index that indicates the current buffer size of the single LCG with data to be transmitted and a second index indicating a nominal value for a buffer size of a second LCG.

23. The UE of claim 22, wherein the second LCG is a configured LCG for the UE.

24. The UE of claim 22, wherein the second LCG is not a configured LCG for the UE.

25. The UE of claim 17, wherein the one or more processors, when detecting the trigger for transmitting the buffer status report (BSR), are configured to:
detect the trigger based at least in part on expiration of a BSR timer with data to be transmitted remaining in a buffer of the single LCG.

26. A network entity for wireless communication, comprising:
a memory; and
one or more processors coupled to the memory, the one or more processors configured to:
receive, from a user equipment (UE) with a single logical channel group (LCG) that has uplink data to be transmitted, a long BSR that indicates a current buffer size of the single LCG; and
activate an uplink option for the UE based at least in part on a determination that the current buffer size indicated in the long BSR satisfies a threshold.

27. The network entity of claim 26, wherein the threshold is greater than a maximum buffer size indication in a short BSR.

28. The network entity of claim 26, wherein the long BSR includes an index indicating a nominal value for a buffer size of an LCG without data to be transmitted.

29. The network entity of claim 26, wherein the one or more processors, when activating the uplink option for the UE, are configured to:
transmit, to the UE, an indication to switch from a first bandwidth part to a second bandwidth part based at least in part on the current buffer size indicated in the long BSR.

30. The network entity of claim 26, wherein the one or more processors, when activating the uplink option for the UE, are configured to:
transmit, to the UE, an indication to increase a number of layers to be multiplexed in an uplink communication from the UE.

* * * * *